Patented Dec. 30, 1924.

1,520,953

UNITED STATES PATENT OFFICE.

ERNST M. JOHANSEN, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

METHOD OF SEPARATING OILS.

No Drawing. Original application filed May 9, 1919, Serial No. 295,946. Divided and this application filed January 20, 1921. Serial No. 438,773.

*To all whom it may concern:*

Be it known that I, ERNST M. JOHANSEN, a citizen of the United States, residing in the city and county of Philadelphia, State of Pennsylvania, have invented certain new and useful Improvements in Methods of Separating Oils, of which the following is a specification.

My invention relates to a method of separating from a mixture of hydrocarbons, oils, oily materials or the like one or more of the components of the mixture.

In accordance with my invention, an emulsifiable hydrocarbon, oil or oily material is separated from a mixture with other material, as a hydrocarbon, oil or oily material which is emulsifiable to different degree or emulsifiable with different degree of facility or readiness, by subjecting the mixture to the action of a suitable emulsifying agent, as soap, in the presence of water, or equivalent, and separating the resulting emulsion from the unemulsified materials, and thereafter breaking the emulsion and separating therefrom the previously emulsified material.

In accordance with my invention, unsaturated (including aromatic) hydrocarbons or oils may be separated from a mixture of them with saturated hydrocarbons or oils, as paraffine, naphthenic and other oils, by washing with or application of suitable soap solution, my method being particularly available where the unsaturated hydrocarbon or oil occurs in mixture with a paraffine or other saturated hydrocarbon or oil of substantially the same boiling point, which mixture does not readily yield to separation by fractional distillation.

I have found that at least in a general way the interfacial tension of unsaturated (including aromatic) hydrocarbons toward water is lower than the interfacial tension toward water of saturated hydrocarbons, as paraffine, naphthenic and other oils, and sufficiently so to cause different characteristic actions between them and water so far as concerns emulsification.

The unsaturated hydrocarbons more readily emulsify with water in the presence of an emulsifying agent, such as soap. Due to the lower interfacial tension between unsaturated hydrocarbons and water, it requires a less concentrated solution of soap further to reduce the interfacial tension to the point desirable or essential for emulsification with water than in the case of saturated hydrocarbons. There accordingly is, so to speak, between the two classes of hydrocarbons and an aqueous solution of emulsifying agent, as soap, a selective action so far as concerns emulsification with such solution. This is taken advantage of to separate one class of hydrocarbons from another, as by using a solution of emulsifying agent, as soap, of any suitable character, including those hereinafter mentioned, and of suitable concentration for emulsifying the unsaturated hydrocarbons, but unsuitable, because too dilute, for emulsifying the saturated hydrocarbons. The mixture is subjected, as by agitation, to the action of soap solution; or the soap may first be added to the mixture which is then agitated with water; or acid, corresponding to the desired soap, may be added to the mixture which is then agitated with a water solution of suitable alkali. In each case there is formed an emulsion of the unsaturated hydrocarbons, the unemulsified hydrocarbons separating from the emulsion, and the emulsion may then readily be broken by any suitable known method (as by centrifugal action, application of electrolyte, rise in temperature, distillation, etc.) and the unsaturated hydrocarbons separated from the water and soap. This mode of separation is particularly utilizable in the case when the different types of materials or hydrocarbons have substantially the same boiling point, the unsaturated hydrocarbons being emulsified, the unemulsified saturated hydrocarbons separating into an upper layer while in the lower layer the emulsified unsaturated hydrocarbons are separated; the emulsion is then broken and the unsaturated hydrocarbons separated. This affords a method of separation of different classes of hydrocarbons from each other in a case where fractional distillation will not effect separation. For example, an aromatic hydrocarbon, as benzol, toluol or xylol may be in association or mixture with a saturated hydrocarbon of similar boiling point, and they may be separated by this selective emulsifying action.

While in the foregoing examples hydrocarbons of different series, as saturated and unsaturated, are separated from each other, it will be understood that my method of separation is applicable to any hydrocarbons, oils or oily material which exhibit differences in their tendencies to emulsify, whereby the more readily emulsifiable materials may be separated from those which are not so readily emulsifiable.

My invention is not limited as regards the sharpness or completeness of separation of one class of materials from another, and comprehends the case where, by practicing the method herein described, the separated mass of material contains a greater proportion of one class of materials than existed in the mixture treated.

It further will be understood that the theory hereinbefore stated as underlying the action is believed to be correct, but does not limit my invention, which does not depend for its utility upon the theory involved.

As emulsifying agent for the practice of my invention any suitable water soluble emulsifying agent or soap may be employed, and in general substances which will lower the surface tension of water to suitable degree or extent, such as resinates or resin soaps, soaps of fatty acids, including ordinary domestic or laundry soaps, naphthenic soaps or naphthenates, sulfonic soaps or sulfonates, including those derived from the organic as sulfonic acids, resulting from treatment of oils by strong or fuming sulphuric acid, both those found in the separated sour oil and those found in the acid sludge; these water soluble soaps are preferably those of the alkali metals and ammonium. For forming any of the soaps utilizable in my method, and especially for forming soaps by reaction with organic acids, especially sulfonic acids from petroleum, there may be employed as suitable reagent sodium, potassium or ammonium hydroxide, or in lieu of hydroxides of these metals, their carbonates, bicarbonates or equivalents may be employed.

The following is an example illustrating the practice of my invention: A mixture of benzol and petroleum naphtha in equal volumes is agitated at ordinary temperature with from about five to about ten volumes of a one per cent solution of sodium salts of the acids resulting from the treatment of petroleum by strong sulphuric acid; the mixture is allowed to separate and the unemulsified hydrocarbons will be found to contain a far smaller proportion of benzol. The emulsified hydrocarbons may be recovered from the emulsion in any suitable way, as for example, by distillation, with or without previous acidification, and the hydrocarbons which were previously emulsified will be found to contain a far greater proportion of benzol.

For the sake of brevity in the appended claims the term "soap" is utilized in the generic sense to include soaps of the character herein specified and equivalent emulsifying agents which will effect the emulsifying actions and results of the character herein described.

This application is a division from my application Serial No. 295,946, filed May 9, 1919, upon which Patent No. 1,438,764 issued on December 12, 1922.

What I claim is:

1. The method of separating an oily material from a mixture containing the same and another oily material which is less readily emulsifiable, which consists in subjecting the mixture to a selective emulsifying action, of a solution of a soap and thereby emulsifying the more readily emulsifiable material to a greater extent than the less readily emulsifiable material, and separating the emulsion from the unemulsified material.

2. The method of separating an oily material from a mixture containing the same and another oily material of substantially the same boiling point which is less readily emulsifiable, which consists in treating the mixture with a solution of a soap and thereby emulsifying the more readily emulsifiable material to a greater extent than the less readily emulsifiable material, and separating the emulsion from the unemulsified material.

3. The method of separating an oily material from a mixture containing the same and another oily material which is less readily emulsifiable, which consists in subjecting the mixture to a selective emulsifying action of a solution of a soap and thereby emulsifying the more readily emulsifiable material to a greater extent than the less readily emulsifiable material, separating the emulsion from the unemulsified material, thereafter breaking the emulsion, and separating the previously emulsified material.

4. The method of separating an oily material from a mixture containing the same and another oily material of substantially the same boiling point which is less readily emulsifiable, which consists in treating the mixture with a solution of a soap and thereby emulsifying the more readily emulsifyable material to a greater extent than the less readily emulsifiable material, separating the emulsion from the unemulsified material, thereafter breaking the emulsion, and separating the previously emulsified material.

5. The method of separating from each other hydrocarbons of different series, as unsaturated from saturated hydrocarbons, which consists in agitating the mixture with soap and water in such quantities that the hydrocarbons of one series will become emulsified to a substantial extent while those of another series do not so readily emulsify, and separating the emulsion from the unemulsified hydrocarbons.

6. The method of separating from each other hydrocarbons of different series, as unsaturated from saturated hydrocarbons, which consists in agitating the mixture with soap and water in such quantities that the hydrocarbons of one group will become emulsified to a substantial extent while those of another group do not so readily emulsify, separating the emulsion from the unemulsified hydrocarbons, breaking the emulsion, and separating the hydrocarbons therefrom.

7. The method of separating from each other hydrocarbons of different series, as unsaturated from saturated hydrocarbons, which consists in subjecting the mixture to the selective emulsifying action of a soap solution, and separating the unemulsified hydrocarbons from the emulsion.

8. The method of separating from each other hydrocarbons of different series and having substantially the same boiling point, which consists in subjecting the mixture to the selective emulsification action of a soap solution, and separating the unemulsified hydrocarbons from the emulsion.

9. The method of separating from each other hydrocarbons of different series, as unsaturated from saturated hydrocarbons, and having substantially the same boiling point, which consists in agitating the mixture with soap and water in such quantities that hydrocarbons of one series will become emulsified to a substantial extent while those of another series do not so readily emulsify, and separating the resulting emulsion from the unemulsified hydrocarbons.

10. The method of separating from each other hydrocarbons of different series, as unsaturated from saturated hydrocarbons, and having substantially the same boiling point, which consists in agitating the mixture with soap and water in such quantities that hydrocarbons of one series will become emulsified to a substantial extent while those of another series do not so readily emulsify, separating the resulting emulsion from the unemulsified hydrocarbons, and breaking the emulsion to separate the hydrocarbons therefrom.

11. The method of separating from each other hydrocarbons of different series, as unsaturated from saturated hydrocarbons, which consists in subjecting the mixture to the selective emulsifying action of a solution of a soap of such dilution that the hydrocarbons of one series are to materially greater extent emulsified than hydrocarbons of another series, and separating the unemulsified hydrocarbons from the emulsion.

12. The method of separating from each other hydrocarbons of different series, as unsaturated from saturated hydrocarbons, which consists in subjecting the mixture to the selective emulsifying action of a solution of a soap of such dilution that the hydrocarbons of one series are to materially greater extent emulsified than hydrocarbons of another series, separating the unemulsified hydrocarbons from the emulsion, and breaking the emulsion to separate the previously emulsified hydrocarbons.

13. The method of separating from each other hydrocarbons of different series, as unsaturated from saturated hydrocarbons, and having substantially the same boiling point, which consists in subjecting the mixture to the selective emulsifying action of a solution of a soap of such dilution that the hydrocarbons of one series are to materially greater extent emulsified than hydrocarbons of another series, and separating the unemulsified hydrocarbons from the emulsion.

14. The method of separating from each other hydrocarbons of different series, as unsaturated from saturated hydrocarbons, and having substantially the same boiling point, which consists in subjecting the mixture to the selective emulsifying action of a solution of a soap of such dilution that the hydrocarbons of one series are to materially greater extent emulsified than hydrocarbons of another series, separating the unemulsified hydrocarbons from the emulsion, and breaking the emulsion to separate the previously emulsified hydrocarbons.

15. The method of separating from each other an aromatic hydrocarbon and a hydrocarbon of different series, which comprises subjecting the mixture to the selective emulsifying action of a solution of a soap of such character that the hydrocarbons of one of said series are to materially greater extent emulsified than the hydrocarbons of the other series, and separating the unemulsified hydrocarbons from the emulsion.

In testimony whereof I have hereunto affixed my signature this 18th day of January, 1921.

ERNST M. JOHANSEN.